March 24, 1970 W. RIEDEL 3,502,403
MOTION PICTURE PROJECTOR WITH FRAME FREQUENCY CONTROL
Filed July 26, 1967

INVENTOR:
WOLFGANG RIEDEL

BY Michael S. Striker his ATTORNEY

United States Patent Office 3,502,403
Patented Mar. 24, 1970

3,502,403
MOTION PICTURE PROJECTOR WITH FRAME FREQUENCY CONTROL
Wolfgang Riedel, Winnenden, Germany, assignor to Robert Bosch, Elektronik und Photokino G.m.b.H., Stuttgart-Unterturkheim, Germany
Filed July 26, 1967, Ser. No. 656,242
Claims priority, application Germany, May 2, 1967, B 88,458
Int. Cl. G03b 1/22
U.S. Cl. 352—194                              12 Claims

ABSTRACT OF THE DISCLOSURE

The in-and-out cam of the pulldown for motion picture projectors has several concentric cam faces tracked by one end of a follower the other end of which transmits motion to the pulldown lever. The follower is fulcrumed at its other end so that its one end can be moved into registry with a selected cam face. Each cam face can cause the pulldown lever to advance the film at a different frequency independently of the shutter speed. The in-and-out cam derives motion from the drive for the shutter.

BACKGROUND OF THE INVENTION

The present invention relates to motion picture projectors in general, and more particularly to improvements in the frame frequency controls for motion picture projectors. Still more particularly, the invention relates to improvements in the construction and mounting of the in-and-out cam in the pulldown and to improvements in the construction, mounting and manner of adjustment of the follower which tracks the in-and-out cam and transmits motion to the pulldown lever without affecting the shutter speed.

German DAS No. 1,186,326 discloses a motion picture projector wherein the follower is installed in a sleeve which is shiftable lengthwise of the pulldown lever in order to change the frame frequency. Thus, the follower performs a translatory sidewise movement and changes the point of engagement with the pulldown lever which, in turn, causes changes in the extent to which the claw of the pulldown lever penetrates into the perforations of movie film. Furthermore, the bias of the spring which urges the claw into engagement with the film also changes which affects the useful of the pulldown and generates considerable noise. Finally, the mechanism which changes the position of the follower with reference to the pulldown lever occupies too much room so that such pulldowns cannot be incorporated in all types of motion picture projectors.

SUMMARY OF THE INVENTION

It is an object of my invention to provide a novel and improved pulldown for motion picture projectors wherein the position of the follower can be changed with reference to the in-and-out cam but without necessitating a displacement of that part of the follower which transmits motion to the pulldown lever.

Another object of the invention is to provide a pulldown which occupies little room, wherein the frame frequency can be changed independently of the shutter speed, and wherein the wear on the parts is much less than in presently known motion picture projectors with frame frequency control.

A further object of the invention is to provide a motion picture projector which embodies the improved pulldown.

A concomitant object of the invention is to provide a novel in-and-out cam for the pulldown of a motion picture projector and to provide a novel mounting for the follower in such pulldown.

An ancillary object of the invention is to provide a simple and compact drive for the in-and-out cam.

Another object of the invention is to provide a pulldown which is practically noiseless, wherein the selected frame frequency can be maintained for any desired period of time and wherein the selected frame frequency can be determined at a glance.

Briefly outlined, one feature of my invention resides in the provision of a motion picture projector which comprises a rotary shutter, drive means for rotating the shutter at a desired speed, and a novel pulldown for intermittently transporting the film lengthwise at several frequencies without necessitating a change in shutter speed and without affecting the useful life of the pulldown lever. The pulldown comprises a motion transmitting member which preferably resembles a one-armed pulldown lever and has at its free end a film engaging portion or claw which is movable back and forth in and counter to the direction of film travel by means of a customary cam driven by the shaft of the shutter. The claw is further movable between first and second positions of engagement with and disengagement from the film, i.e., substantially at right angles to the direction of film travel, to transport the film (always by the length of a frame) while moving, in its first position, in the direction of film travel. The pulldown comprises a preferably pin- or post-shaped follower one end portion of which is in engagement with the pulldown lever and the other end portion of which can track one of two or more annular faces on a travelling in-and-out cam. Each cam frace is designed and arranged to move the claw between first and second positions at a different frequency through the intermediary of the follower, and the latter is fulcrumed in the region of its first end portion to permit movement of the second portion into engagement with a selected cam face and to thus change the frequency of film advance independently of the shutter speed.

The in-and-out cam is preferably but need not be constituted by a single disk-shaped face cam which receives motion from the drive of the shutter so that the speed of this cam is proportional to the shutter speed. The cam faces are provided with different numbers of rises or lobes and depressions or recesses to cause movements of the claw at right angles to the direction of film advance and at a desired frequency. A spring biases the second end portion of the follower against the adjoining cam face.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of certain specific embodiments with reference to the accompanying drawing:

DESCRIPTION OF THE PREFERRED EMBODIMENTS

Figure 1:
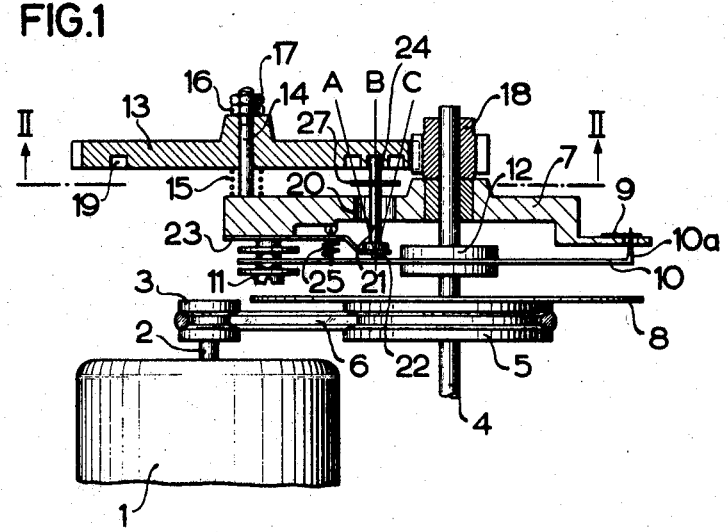
FIG. 1 is a fragmentary sectional view of a motion picture projector which embodies my invention and wherein the pull-down is arranged to advance the film at a maximum frequency, the section being taken in the direction of arrows substantially as seen from the line I—I of FIG. 2.

The motion picture projector shown in FIG. 1 comprises a prime mover which is constituted by an electric motor 1 and forms part of the drive for a rotary shutter 8. The output shaft 2 of the motor 1 carries a pulley 3. A second pulley 5 is mounted on a shaft 4 which carries the shutter 8. A V-belt 6 which is trained around the pulleys 3, 5 transmits motion from the shaft 2 to the shaft 4. The rotational speed of the shaft 2 and the ratio of the belt transmission including the pulleys 3, 5 and belt 6 are selected in such a way that the shaft 4 rotates at a predetermined speed, for example, at 18 revolutions per second. The shaft 4 is journalled in an internal partition or wall 7 of the projector housing. The configuration of the shutter 8 is of well known design, i.e., this shutter will interrupt the light beam between the projection lamp and the film 9 while the film is being advanced by the length of a frame.

The film 9 is transported intermittently by a novel pulldown. This pulldown comprises a one-armed motion transmitting pulldown lever 10 having a tooth or claw 10a which is movable in as well as at right angles to the direction of film advance so as to enter a perforation of the film 9 when it travels in the direction of film advance but to be disengaged from the film when it moves opposite to such direction. The left-hand end of the lever 10 is turnable and tiltable about the axis of a pivot pin 11 which is mounted on the partition 7. A customary spring (not shown) biases the pulldown lever 10 against the periphery of a disk-shaped cam 12 which is affixed to the shaft 4 and cooperates with the spring to move the claw 10a back and forth in and counter to the direction of film advance. The cam 12 cooperates with the spring to cause the lever 10 to perform a forward stroke and a return stroke during each revolution of the shaft 4, i.e., the number of forward or return strokes is eighteen per second.

My present invention is particularly concerned with that part of the pulldown which causes the pulldown lever 10 to move the claw 10a back and forth in directions at right angles to the direction of film advance, i.e., with the mechanism which causes the claw 10a to enter into (first position) and to be withdrawn from (second position) the perforations of the film 9. This mechanism comprises a single disk-shaped in-and-out face cam 13 which is axially movably and turnably mounted on a shaft 14 affixed to the partition 7. The shaft 14 is parallel with the shafts 2 and 4 and the in-and-out cam 13 is biased axially by a helical spring 15 which maintains it in abutment with a stop nut 16 on the rear or upper end of the shaft 14. The stop nut 16 is fixed in selected axial position by a lock nut 17. The cam 13 further carries an annulus of teeth meshing with the teeth of a pinion 18 on the shaft 4 Thus, the cam 13 receives motion from the output shaft 2 through the intermediary of the belt transmission 3, 5, 6, shaft 4 and pinion 18.

The front face of the in-and-out cam 13 (namely, that face which is turned toward the pulldown lever 10) includes three concentric annular cam faces each comprising one or more recesses or depressions 19 and rises or lobes 38. Each recess 19 is bounded at its angularly spaced ends by an inclined surface with gradual transition in the adjoining rise 38. The outermost annular face of the cam 13 comprises three equidistant recesses 19; the median cam face comprises six equidistant recesses 19; and the innermost cam face has a single recess 19.

The aforementioned mechanism which moves the pulldown lever 10 at right angles to the direction of film travel further comprises a post- or pin-shaped follower 21 which can track the in-and-out cam 13 and transmits motion to the claw 10a through the intermediary of the pulldown lever. The follower 21 is located between the pivot pin 11 and the cam 12 and extends with clearance through a slot 20 in the partition 7. One end portion (22) of the follower 21 is attached to the free end of a fulcrum 23, here shown as a leaf spring, the other end of which is affixed to the partition 7. The other end portion 24 of the follower 21 is arranged to track a selected face of the cam 13 and the follower is permanently biased against the cam 13 by a helical contraction spring 25 which operates between the lever 10 and the partition 7. The follower 21 further extends through an aperture 26 (see FIG. 2) provided in a manually operated frame frequency selector 27. This selector is installed in the space between the in-and-out cam 13 and the partition 7 and resembles a two-armed lever the longer arm of which is provided with the aperture 26. The shorter arm is constituted by a lug or handle 28 which can be engaged by hand. The selector 27 is turnable on a pivot pin 29 which is mounted on the partition 7 or on another stationary part of the projector housing. The arrangement is such that, when the selector 27 is turned through the intermediary of the lug 28, the aperture 26 travels substantially radially of the cam 13, i.e., toward or away from the shaft 14. The purpose of the longer arm of the selector 27 is to swivel or pivot the follower 21 about the latter's end portion 22 in order to move the end portion 24 into registry with one of the three cam faces of the cam 13. The three angular positions of the follower 21 are denoted by the characters A, B and C, the positions A and C being indicated by inclined lines. In order to facilitate accurate setting and retention of the selector 27 in positions which respectively correspond to the positions A, B and C of the follower's end portion 24, the selector carries an index or marker 30 which can be placed into registry with either one of three graduations 31, 32, 33 provided on a fixed scale carried by the projector housing adjacent to the central portion of the selector 27. When the index 30 respectively registers with the graduations 31, 32, 33, the end portion 24 of the follower 21 respectively assumes the positions A, B and C. It is clear that the position of the index 30 and scale having the graduations 31–33 may be reversed. The selector 27 may be releasably arrested in selected angular positions by a detent structure including a resilient pawl 37 which can enter into one of three angularly spaced peripheral notches 34, 35, 36 of the selector. Other types of detent means can be employed with equal advantage.

Figure 2:
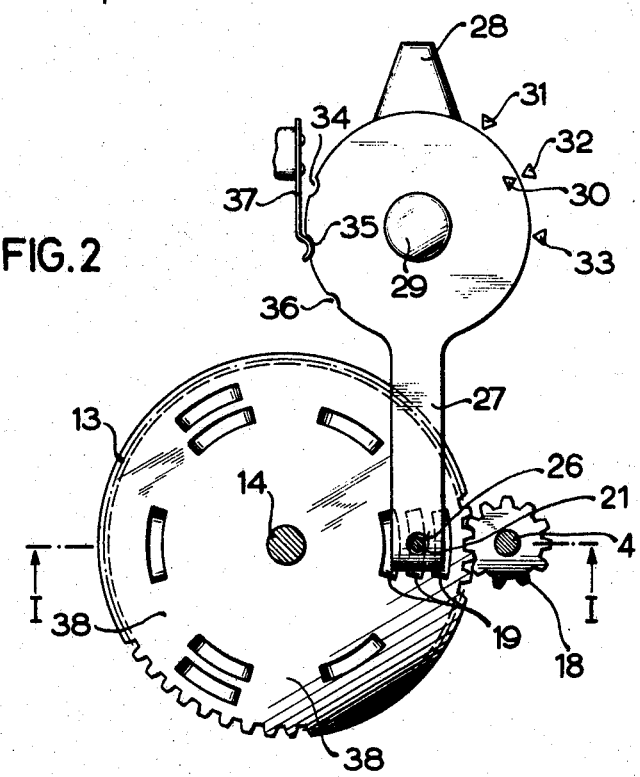
FIG. 2 is a view as seen in the direction of arrows from the line II—II of FIG. 1.

The numerals 38 denote in FIG. 2 such portions (lobes or rises) of the cam 13 which are disposed between the depressions or recesses 19 and which are tracked by the end portion 24 of the follower 21 when this end portion has been caused to leave a recess. The pulldown lever 10 is then held in a position in which the claw 10a is withdrawn from the perforation of the film 9 and the follower 21 then causes the spring 25 to store energy. The depth of recesses 19 is such that the spring 25 pulls the claw 10a into the adjoining perforation of the film 9 when one of these recesses receives the end portion 24. It is further clear that the length of each recess 19 (as seen in the circumferential direction of the in-and-out cam 13) suffices to insure that the claw 10a can advance the film 9 by the length of a frame.

In the illustrated embodiment, the transmission ratio between the shaft 4 and cam 13 is six-to-one. The median annular face of the cam 13 comprises six equidistant recesses 19. Thus, and if the selector 27 has set the follower 21 in the position B, and assuming that the shaft 4 rotates at eighteen revolutions per second, the film 9 will be advanced at a rate of eighteen frames per second. In other words, the film will be advanced by the length of a frame during each revolution of the shutter 8.

If the selector 27 is thereupon caused to move the follower 21 to the position C, the end portion 24 of this follower will track that annular face of the cam 13 which is provided with three equidistant recesses 19. This means that the film 9 will be advanced by the length of a frame during each second revolution of the shutter 8, i.e., at the rate of nine frames per second. If the operator decides to move the index 30 into registry with the graduation 33 so that the pawl 37 snaps into the notch 36, the end portion 24 of the follower 21 will track that face of the cam 13 which is provided with a single recess 19. Thus, the film 9 will be advanced at the rate of three frames per second.

FIG. 1 shows that the end portion 22 of the follower 21 need not change its position (or changes its position only negligibly if the end portion 24 is moved between the positions A, B and C. In other words, the distance between the point where the end portion 22 engages with the pulldown lever 10 and the pivot pin 11 or the spring 25 remains substantially unchanged irrespective of the setting of the selector 27, i.e., irrespective of the selected frame frequency. This is of considerable advantage insofar as the useful life of the pulldown is concerned. Furthermore, such mounting of the follower 21 reduces noise and protects the pulldown from excessive wear because the magnitude of stresses transmitted to the lever 10 is the same in each setting of the selector 27.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a motion picture projector, a combination comprising a shutter; drive means for said shutter; and a pulldown for intermittently transporting the film lengthwise, including a motion transmitting member having a film engaging portion movable back and forth in and counter to the direction of film travel and also between first and second positions of engagement with and disengagement from the film to transport the film by the length of a frame while moving in said first position thereof in the direction of film travel, follower means having a first portion in engagement with said motion transmitting member and a second portion, and travelling in-and-out cam means having a plurality of cam faces for the second portion of said follower means, each of said cam faces being arranged to move the film engaging portion between said first and second positions at a different frequency through the intermediary of said follower means, and stationary fulcrum means tiltably supporting said follower means in the region of said first portion thereof so as to permit movement of said second portion into engagement with a selected cam face to thereby change the frequency of film advance independently of the speed of said shutter and without appreciable changes in the extent of movement of said film engaging portion between said first and second positions thereof.

2. A combination as defined in claim 1, wherein said pulldown further comprises means for biasing the second portion of said follower means against the adjoining cam face.

3. A combination as defined in claim 2, wherein said follower means includes a post and wherein said first and second portions of said follower means are respectively constituted by the ends of said post.

4. A combination as defined in claim 2, further comprising resilient fulcrum means for said follower means.

5. A combination as defined in claim 4, further comprising a housing, said fulcrum means comprising a leaf spring having one end connected to said housing and another end swingably supporting the first portion of said follower means.

6. A combination as defined in claim 2, wherein said in-and-out cam means is constituted by a single rotary face cam and further comprising means for rotating said face cam at a speed which is proportional to the speed of said shutter.

7. A combination as defined in claim 6, wherein each of said cam faces is an annulus and wherein each of said cam faces has a different number of rises alternating with depressions.

8. A combination as defined in claim 2, further comprising selector means operative to move the second portion of said follower means between said cam faces.

9. A combination as defined in claim 8, further comprising a housing accommodating said shutter, said drive means and said pulldown, said selector means comprising a manually operated portion extending from said housing.

10. A combination as defined in claim 8, further comprising detent means for yieldably holding said selector means in a plurality of positions in each of which said second portion of the follower means tracks a different cam face.

11. A combination as defined in claim 10, wherein said selector means comprises a lever turnable about a fixed axis and having a first arm provided with an aperture receiving a third portion of said follower means between said first and second portions thereof and a second arm engageable by hand to turn said lever.

12. A combination as defined in claim 10, further comprising index means and graduated scale means for indicating the positions of said selector means, one of said index and scale means being stationary and the other thereof being provided on said selector means.

References Cited

UNITED STATES PATENTS

| | | | |
|---|---|---|---|
| 3,067,663 | 12/1962 | Kremp | 95—44 |
| 3,212,840 | 10/1965 | Roman et al. | 352—194 |
| 3,261,654 | 7/1966 | Faber et al. | 352—180 |

NORTON ANSHER, Primary Examiner

R. L. MOSES, Assistant Examiner

U.S. Cl. X.R.

352—180